Jan. 23, 1934.  G. C. SNYDER  1,944,282
LAMINATED BOARD AND METHOD OF MAKING THE SAME
Original Filed March 10, 1928   4 Sheets-Sheet 4
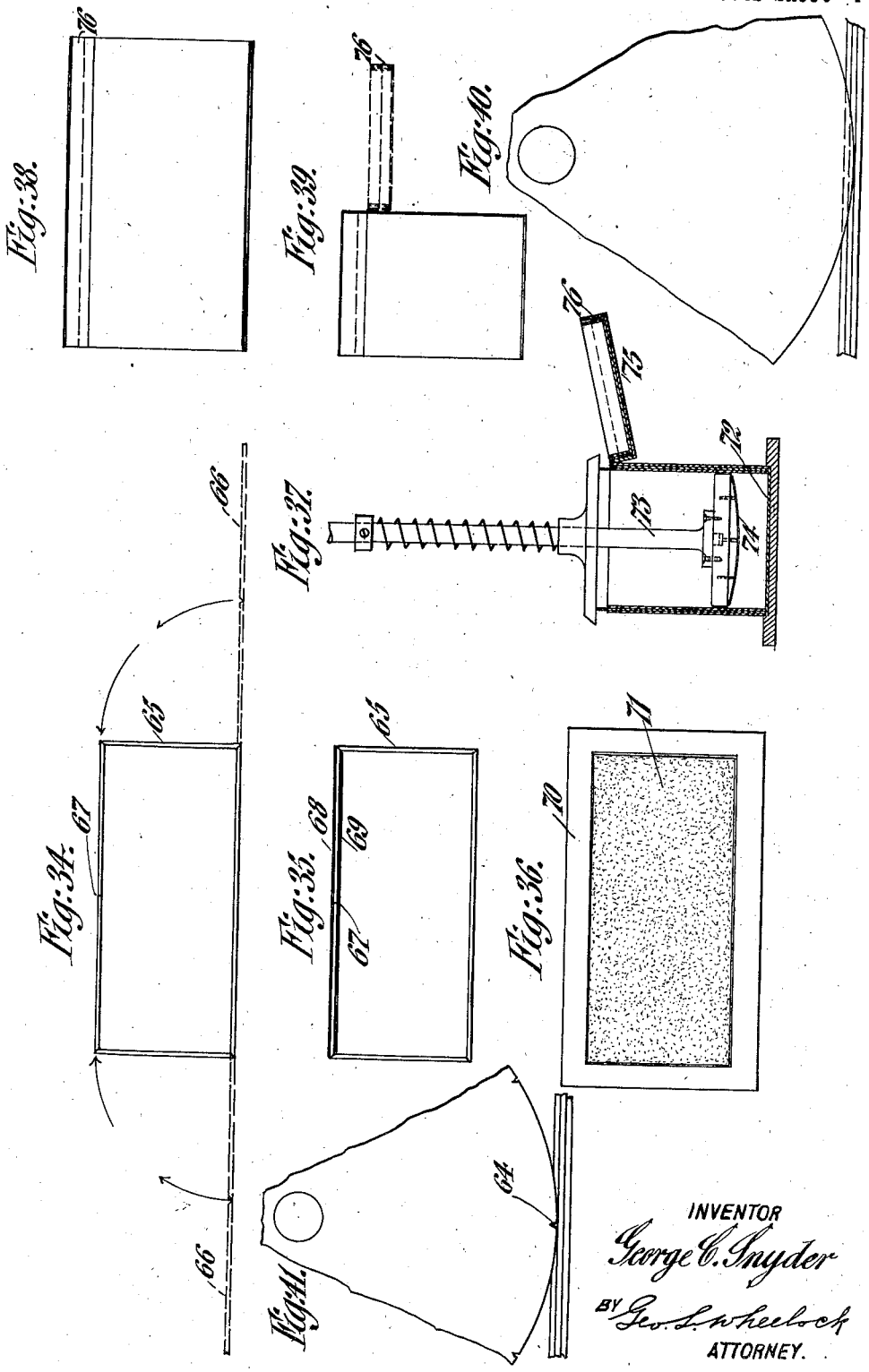
INVENTOR
George C. Snyder
BY Geo. L. Wheelock
ATTORNEY.

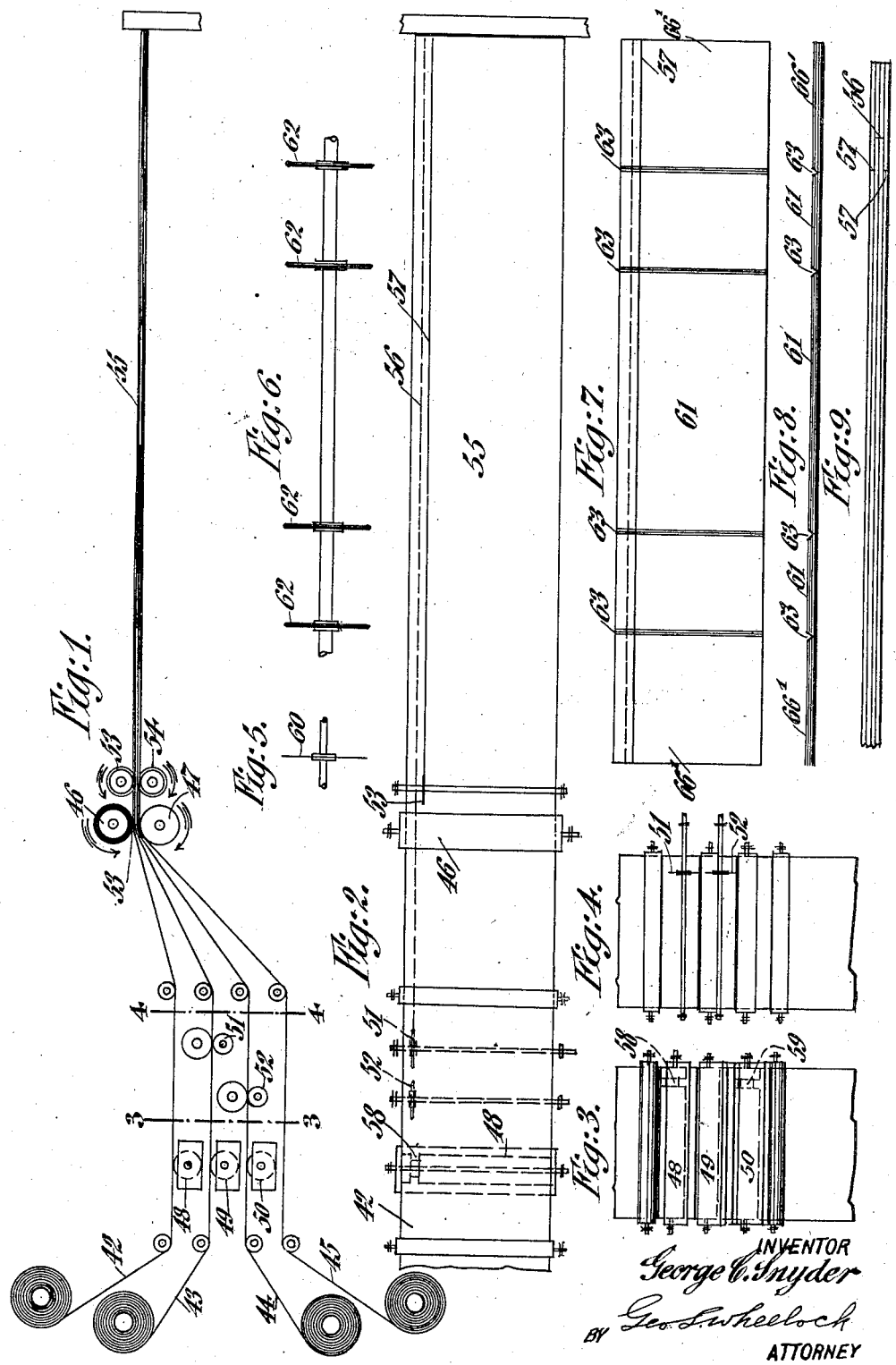

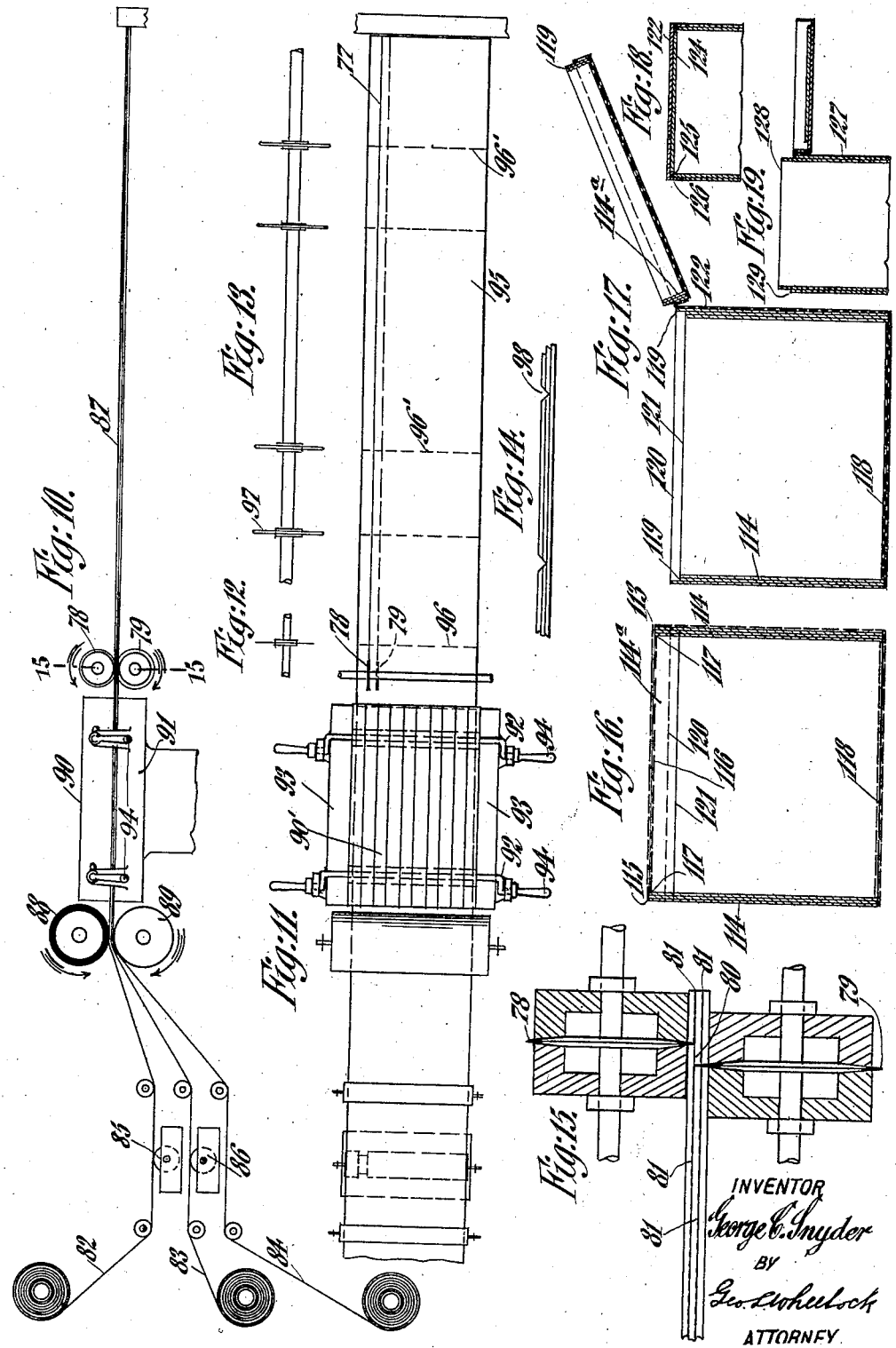

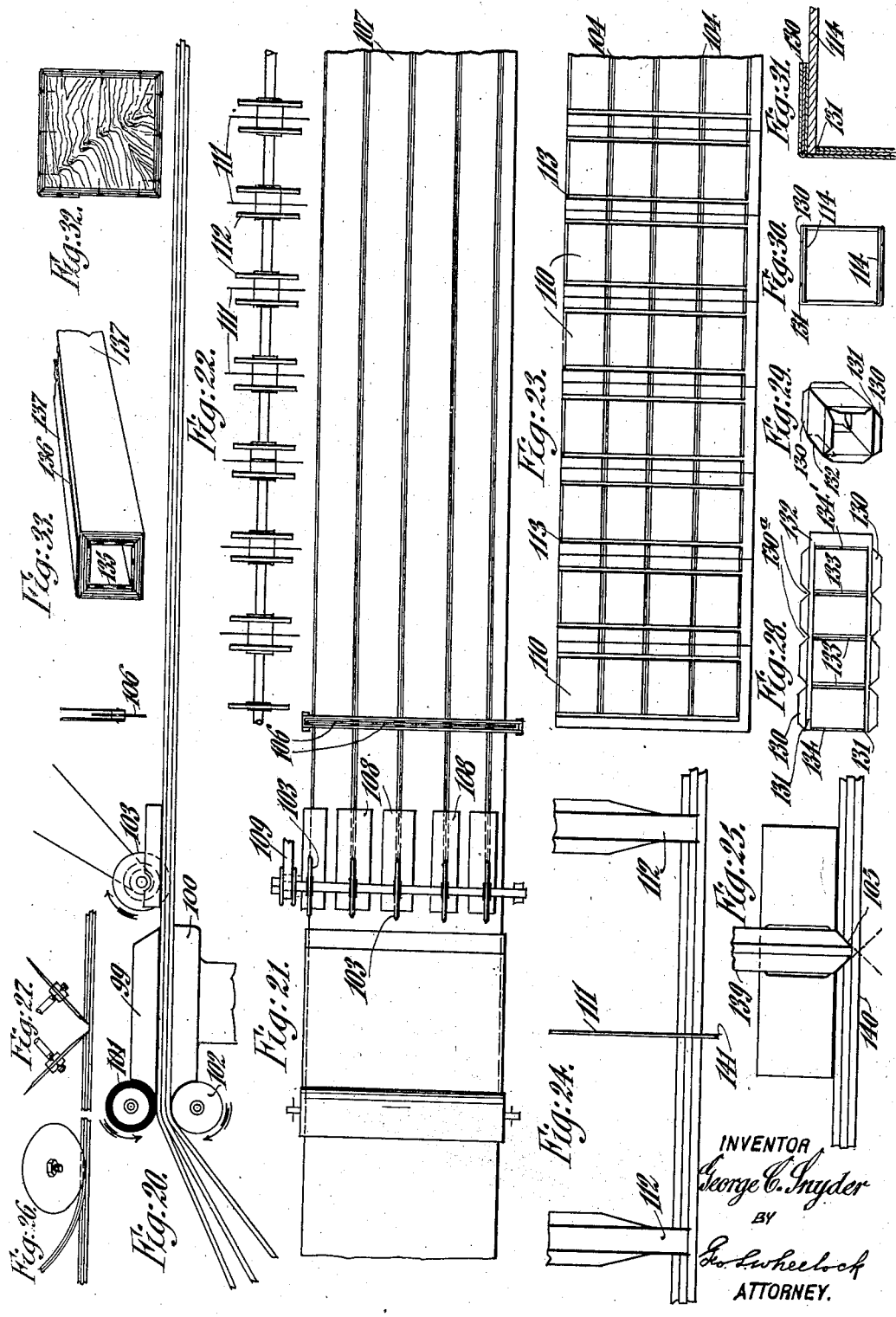

UNITED STATES PATENT OFFICE

1,944,282

LAMINATED BOARD AND METHOD OF MAKING THE SAME

George C. Snyder, Elmhurst, N. Y., assignor to The Guardian Trust Company, Cleveland, Ohio, a corporation of Ohio Application March 10, 1928, Serial No. 260,787
Renewed February 18, 1933

10 Claims.  (Cl. 154—2)

In bonding laminated sheets together, the common practice is to pass adhesively coated sheets between steel pressure-rollers; this does not give best results, the effect on the stock is to produce a continuous wave of over-pressure on each face, along localized transverse areas; by such over-pressure the components of the stock are distorted, they are moved inwardly from each face in a continuous wave of transient and opposed circular formations; as the stock moves from the line of pressure a countermove occurs as the transiently disturbed components, in response to inherent resiliency, straighten and flatten out again; this flattening out of the stock freed from confinement destroys the good bond which transiently existed and during the countermove air finds its way into the stock and the result is a relatively spongy product. The present invention corrects these faults and provides many other distinctive betterments in the arts upon which it bears.

The present invention, which is based on many years of costly experiments and practice, provides for improving the general quality of laminated stock in the web; the general quality depends mainly upon two factors, first comes the nature and quality of the supply webs and second the nature and quality of the bonds between the supply webs. The universal method of the present invention provides for the use of supply webs of paper, paper-board, fabrikoid, zinc, tin, or any other material to be had in long webs; however, where metal is used a good adhesive bond requires that the metal web shall come next to a fibrous one. The present invention provides for making bonds that are solid, strong, enduring,—made against flat pressure simulating the effect of a screw press and pressing a large area at once without distortion of the stock whatsoever; and therefore without the countermove which so seriously affects all stock made by common methods. My method of flat pressing of laminated stock in the web is carried out while the stock is in motion and is being simultaneously subjected to other operations such as slitting, grooving, trimming, or other machining of either superficial or deep-cut kind and at the same time the stock may be printed or labels may be attached.

The present invention also provides other improvements in laminated stock in the web, by which the market for such stock is broadened; the other improvements are also due to the high efficiency of my novel universal method by which extra high grade laminated stock in the web is automatically made, having features which invite the profitable conversion of such stock into useful articles for which laminated stock has not heretofore been fitted; thus, the market is broadened. Through such means and method flows the rapid production of the stock, so machined and so treated that pre-specified blanks may be cross-cut from it in ready condition for quick and easy forming into such articles as jewel cases, candy boxes, cigar boxes (specially treated) shipping cases, and luggage-like instrument cases, suit cases, trunks, for example;—very simple adjustments to change from one specification to another.

The invention provides for converting the superior stock into superior articles and without any waste or scrap from start to finish, except trifling dust sucked from the machine. Such economies are impossible under common practices and have great competitive importance. Provision is made for slitting, semi-slitting, and otherwise machining and treating the stock in the web while it is in motion; the simultaneous operations are capable of so conditioning the stock that pre-specified blanks cut from it shall posses., for example, ready-made, accurate and ready-assembled tongue and groove joints; moreover, these joints are so perfect that no craftsman can produce their equal by any other known method. These joints are superior as closure joints of box covers, trunk tops and the like; they are exemplified in the many samples I have made by my new method to demonstrate the practice.

Where the stock is made for trunks, caskets, export shipping cases, and for certain other articles demanding extreme strength, then a supply web of zinc, tin, aluminum, copper or other metal may be used for the face of the stock which is to be the outside of the ultimate article, and likewise for the inside a special web may be used of cloth-covered paper board, or what you will, inside or outside faces of ultimate articles—large or small ones—may be of imitation leather or special fancy finished paper board. Such special sheet materials used as faces for the stock result in ultimate articles pre-lined inside and outside; any such articles may be "ironed off" or finished to suit by applying locks, hinges, handles or other fittings in the usual ways and with the advantage of having articles that are smooth inside and out—no large overlaps of material, no waste of material, perfect joints everywhere. In these ways strong, light weight, better finished luggage may be made with really tight closure joints and at prices below competition, with profit to maker and new satisfaction to the consumer.

In the drawings, for applying adhesive coatings to supply webs, I show in diagrams, the commonly used rotary fountain type, but my "coating device" patented September 20, 1921, No. 1,391,281, might well be used in these connections because it has been in commercial use for years with satisfaction.

While large-volume makers of boxes, trunks and so forth, will find betterments and economies in the conditioned blanks made by my universal method, they are adapted to small-volume makers as well, because the blanks may be closely packed for shipment in the flat form and they are so fashioned as to require only minor equipment and tools to turn them into the finished articles; this is a long step beyond common procedure in these arts. The laminated stock may be thin or thick, but it is always stronger than a like thickness of plain stock.

For the sake of economy of space, the drawings to be referred to do not show the preferred machine for the universal method as of greater width than necessary to handle the particular stock shown in work; however, it is obvious that the machine may be of any desired width to work stock and to produce several webs of stock abreast of each other at the same time; as the adjustments may consist merely of setting slitting and cutting tools to proper positions on shafts and to proper heights in respect to surfaces of the stock, it is a simple matter to run webs abreast and to machine them all at once, when the appropriate number of machining tools, as slitters, groovers, saws and the like are mounted for such work. Also, it is obvious, the forms of grooves and other superficial machining done may be different from what is shown in the drawings; in fact, one of the objects of the invention is to provide the machine and method with so wide a range of adaptability as to preferably be a really practical universal-machine-method, for producing and machining laminated stock in the web. Other objects of the invention will be clear from the description of improvements which the invention provides.

Still further objects of the invention are to provide adequate and rapid means and methods for cross-cutting, and cross-machining superficially, of stock from the laminated web; also for producing ultimate articles of superior merit, in angular forms and having pre-made precision joints provided by, and incorporated in, the original laminated flat stock, used for the articles.

In making laminated stock for a light weight but very strong article, such as a suit case, for example, both faces may be of thin aluminum and with a "filler" between of cheapest chip board to provide needed thickness or body; when such stock is used for all the six sides of the case and finished with enamel a most durable and fine appearing job results at low costs.

Th accompanying drawings show some of the forms which the stock, tubing, receptacles and closures may take, but other forms may be produced by the same machines and under the same methods, without departing from the spirit of the inventions hereinafter claimed; and such other forms may be as simply produced as those shown, by the mere expedient of machine-adjustment or the throwing into action or out of action certain slitters or cutters of the machine, or by adding to the number of cutters or slitters, or by other such simple modifications.

The invention consists in various improvements in articles and methods and means for producing the same, as hereinafter claimed.

In the drawings

Fig. 1 is a longitudinal elevation of a machine for producing my laminated board or stock;

Fig. 2 is a plan view of such machine;

Figs. 3 and 4 are vertical transverse sectional views on the lines 3—3 and 4—4, respectively, of Fig. 1;

Fig. 5 represents a web cross-cutter;

Fig. 6 represents a series of routers for forming surface grooves;

Fig. 7 is a plan view of a severed strip of routed stock having a tongued and grooved assembled joint;

Fig. 8 is an edge view of the same;

Fig. 9 is an enlarged end view of same, broken off, and showing the construction of the tongued and grooved joint;

Fig. 10 is a side elevation of a modification of my machine, showing the use of flat pressure-surfaces;

Fig. 11 is a plan view of the same;

Fig. 12 represents a web cross-cutter;

Fig. 13 represents a series of routers for forming surface grooves;

Fig. 14 is an enlarged side view, broken away, of a strip of routed stock;

Fig. 15 is an enlarged detail vertical transverse sectional view of opposite slitters for forming offset-shoulder joints (on the lines 15—15);

Fig. 16 is a sectional view of a finished closed box;

Fig. 17 represents the same box opened;

Fig. 18 represents a modified form of closure for a similar box, closed;

Fig. 19 represents the same, opened;

Fig. 20 is a side elevation of another modification of my machine, wherein the routing may be done longitudinally of the stock as well as transversely;

Fig. 21 is a plan view of the same;

Fig. 22 is a series or gang of routers for making surface grooves and cutters for simultaneously severing the stock into a plurality of bendable units;

Fig. 23 is a plan view of such stock after such grooving and severing;

Fig. 24 is a side elevation, relatively exaggerated, of a broken-away section of stock, showing a severing saw and a pair of routers;

Fig. 25 is a transverse elevation, relatively exaggerated, of a broken-out section of stock, showing another form of router;

Fig. 26 represents a side elevation of a modified form of router rotated by the laminated stock itself, for cutting V-shaped grooves without dust by a slitting process;

Fig. 27 is a transverse elevation of the same;

Fig. 28 is a plan view of a blank or unit of routed stock adapted to be formed into a box, having minor portions of the stock cut away to form flaps for securing closures;

Fig. 29 is a perspective view of such unit partially formed into a box;

Fig. 30 is a sectional view of the completed box;

Fig. 31 is an enlarged sectional detail of a corner of the box, showing a method of fixing the closure in its seat;

Fig. 32 is a plan view showing a wooden closure, nailed in;

Fig. 33 is a perspective view, broken off, of tubing having relatively thick walls and a metal lining-sheet.

Fig. 34 diagrammatically represents a method of forming the body of a box from routed stock such as shown in Fig. 7;

Fig. 35 is a plan view of the same formed with a blind butt joint;

Fig. 36 is a plan view of a closure sheet for same, coated with adhesive, and within a holder;

Fig. 37 is an end elevation of an apparatus for assembling the closures to the body;

Fig. 38 is a front elevation of the completely-formed box, closed;

Fig. 39 is an end elevation of the completely-formed box, opened;

Fig. 40 represents a segment of a slitter such, for example, as shown in Fig. 15, and a broken-out section of the laminated board, and Fig. 41 is a segment of a similar slitter provided with nicks in its cutting edge, and a similar broken-out section of the laminated board.

Figs. 1, 2, 3, 4, 5, and 6 diagrammatically represent a machine-method for producing from sheet material laminated stock provided with a tongue-and-groove joint longitudinal of the stock; and Figs. 7, 8 and 9 are views of such stock in the flat condition as produced by the machine-method.

Referring to Figs. 1, 2, 3, 4, the supply-webs 42, 43, 44 and 45 are advanced by pressure-rollers 46 and 47. The rollers 48, 49 and 50 supply adhesive coatings as the supply-webs pass toward and between the pressure-rollers, but before the webs reach the pressure-rollers the inner webs 43 and 44 are slit lengthwise by slitters 51 and 52, and after the so produced laminated stock 55 has passed through and beyond the area of pressure 53, the stock is superficially slit lengthwise to the depth of the thickness of each of the outer supply-webs 42 and 45 by the slitters 53 and 54. In Fig. 2 the dotted line 56 represents the slitting done by slitters 51 and 52 while the superficial slitting is represented by the full line 57. Both slittings 56 and 57 are also shown in Figs. 7 and 9.

In order that the portions of the stock connected by the tongue-and-groove joint shall be ultimately separable from each other, the adhesive is withheld from the adjoining surfaces of the supply-webs 42 and 43 and of the supply-webs 44 and 45 along narrow areas between the slittings 56 and 57. This withholding of adhesive is accomplished through the annular cut-outs 58, 59 in the rollers 48 and 50.

Referring to Fig. 5, 60 is a saw for cross-cutting the stock 55 into sections such as 61 of Figs. 7 and 8, and Fig. 6 diagrammatically represents cutters 62 for forming transverse V-shaped grooves 63 in one or more thicknesses of the stock, as shown in Figs. 7 and 8. One or more of the slitters 51, 52, 53, 54, may be nicked as at 64 in Fig. 41 for the purpose of leaving unslit or connecting material at intervals to hold the parts of the tongue-and-groove joint together for handling the stock, during the manufacture of the so-made stock into formed-up articles, as for example, the box-body 65 shown in Figs. 34 and 35, wherein the outer halves of the dotted lines 66 of Fig. 34 represent the end portions 66' of Figs. 7 and 8 and the full lines of Fig. 34 represent all the sections of stock with the end portions 66' butted together at 67 to form a four-sided box-body. The butt joint 67 may be concealed and reinforced, as by outer sheet 68 and inner sheet 69 of Fig. 35, by adhesively assembling same; and the grooves 63 of Figs. 7 and 8 may be supplied with glue before they are formed into the miter-joints of the body shown in Figs. 34 and 35, so that when the glue hardens the joints will be glued together.

During the forming of the box-body, the tongue-and-groove joint may remain unopened or undisturbed, while closures are applied to the body; and such closures (like the laminated body stock) may be produced in laminated form without scrap-waste, by utilizing the method described, with obvious modifications as to cutters 62 and without the slitting.

Another way of making and assembling closures without scrap-waste is shown in Figs. 36, 37, 38 and 39, wherein the frame 70 shown in Fig. 36 holds the adhesively-coated sheet 71 within the frame, and upon the sheet is placed one of the edges of the body 65 of Fig. 35, which adheres to the edges of the coated sheet. Next an uncoated sheet having an area coinciding with the inside dimensions of the body is placed upon the coated sheet, and adhered thereto so as to laminate the closure. For this purpose an apparatus such as shown in Fig. 37 may be used, and the last-named sheet 72 is shown as having been pressed down by the plunger 73, which has a flexible face 74 which flattens out under pressure to expel air from the adhesive bond between the sheets; after which the tongue-and-groove joint may be opened and other similar sheets assembled as a cover 75 within the grooved band 76 of Figs. 37, 38 and 39, which band is formed as a result of bending the formed stock into box-form, Fig. 34.

The diagrams Figs. 10, 11, 12, and 13 show a similar machine for producing laminated stock having separable longitudinal shoulder-joints 77, produced by top and bottom slitters 78 and 79 which are offset while slitting on parallel lines, as shown in Figs. 11 and 15, wherein the slitters penetrate only through to the seam 80, which is free from adhesive between the two slits. The broken lines 81 indicate adhesive bonds between sheets, while, as stated before, there is an absence of adhesive in the seam 80 between the slits, in order that the shoulder joint so formed shall be ultimately separable when required.

As shown in Fig. 10, the supply webs 82, 83 and 84 are supplied with adhesive by the rollers 85 and 86 for producing a bond between the laminations of the stock 87, which is advanced by and squeezed between rollers 88 and 89, the face of the upper roller 88 being of rubber or other yielding material, of a character to produce a frictional contact for drawing the supply-webs and pushing the laminated stock between the gravity-press 90 and the table 91, which is smooth and flat on the surface contacting with the stock, while the weight 90 may be of separate pieces, as 90', which are held in position by the eccentrically-mounted rods 92 to prevent longitudinal movement of the pieces. These pieces are between the guides 93 to prevent lateral movement of the pieces, but are, however, free to rise and fall automatically with the variations of thickness of the stock, and by movement of the cranks 94 the weight may be raised or lowered for beginning a run of stock, or the like. Fig. 12 represents a cross-cut saw for severing the stock into sections which may be single units such as the section 95 appropriate to be folded into the form of a box body. Fig. 11 shows transverse broken lines, one of which 96 represents the point where the cross-cutting may be done, and the others 96' represent points where the cutters 97 may cut grooves 98, as shown in Fig. 14, for providing bendable lines for forming miter-joints at the corners of a box or the like.

Referring to Fig. 20, the weight 99 of the friction-press is supported by a table 100, and both weight and table have opposed flat friction surfaces between which the stock is bonded while under motion from the power-rollers 101, 102 to and beyond the cutters 103, which may be shaped to do any machining longitudinal of the stock, such as cutting grooves 104 of Figs. 23 and 28, which may be shaped like the groove 105 shown in Fig. 25, and are for the same purpose as the grooves 98 above described. 106 represents a series of saws mounted over the laminated machined stock 107 for cross-cutting the stock into desired lengths. The gravity shoes 108 may be used to hold the stock close down around the cutters 103, which are rotated at high speed by means of the belt 109. The stock 107 may be cross-cut into gangs of blanks 110 by the saws 111 shown in Fig. 22, and at the same time cutters 112 may cut routs or slots 113 to form seats for ends 114, as shown in Figs. 30 and 31. In enlarged form slots and appropriate cutters are shown in Fig. 24, and a broken portion of one of the saws 111 is shown between cutters 112 in said figure.

Fig. 16 is a sectional view of a box having an offset closure-joint which may be called a shoulder-joint. In this view the top horizontal broken line 113 represents a sheet adhered to the laminated stock 114 which forms the sides of the box, and this sheet extends over and is preferably adhered to and flush with the outside top edge 115 of the body of the box. Under this sheet 113 and attached to it, adhesively or otherwise, is another lamination, represented by a broken line 116. This lamination 116 should have a snug fit all around within the box, as at the points 117 where the said lamination contacts with the inner face of the laminated stock at the top of the sides. Thus a closure is formed which is permanently attached to the portions 114a of the sides which are separable from the main body when the closure is opened, as it is in the section, Fig. 17.

A like closure 118 is shown in Figs. 16 and 17 as constituting the bottom of the box, and when the box is closed, as in Fig. 16, the shoulder-joints 119, clearly shown open in Fig. 17, fit snugly together, as shown in Fig. 16, wherein the broken line 120 represents the top shoulder of the main body of the box which is adjacent to the full, parallel horizontal line 121 which represents the lower, inner shoulder on the inside of the box; while in Fig. 17 these lines are both full lines to illustrate said shoulders. An extra sheet or lamination 122 has been adhesively attached, as shown in Fig. 17, to provide a hinge for the top of the box.

Fig. 18 is a sectional view showing a modified type of similar closure closed, and Fig. 19 shows the same open. Fig. 18 shows a top horizontal sheet 123 and an inner sheet 124, which is of less area and adapted to fit quite snugly within the main body of the box when the box is closed, the top edges 125 of the main body extending between the inner sheet 124 and the outer vertical, relatively narrow sheet 126. As shown in Fig. 19 this form of box is also supplied with an extra, adhering sheet 127 providing a hinge for the cover, said figure showing the top edge 128 of the main body, which forms one shoulder, and a lower shoulder 129 formed by an outside sheet. The shoulder 128 fits against the outer sheet 123 of the top of the closure when the box is closed. The outer or inner sheets of the closures of each of the boxes above-mentioned may consist of laminations of paper or wood or may be of solid unlaminated material of any appropriate kind.

Referring to Fig. 28, the box-blank or unit of routed stock is provided with flaps 130 having routed-out closed slots 131 at their bases and parallel to their edges. These slots 131 appear also in Figs. 29, 30 and 31, and are for the purpose of receiving, and holding in place securely, the closures 114 shown in Figs. 30 and 31, wherein the flaps 130 have been turned down and supposedly adhered to the closures. In Fig. 28 the said flaps 130 are extended flatwise; and also in Fig. 29, wherein the flaps 130 are shown open. Fig. 29 also shows the terminal flap 132, which is an extension of the face sheet, and which serves to hold the body in the form shown. The said flap or extensions 132 is seen in broken lines along the top left corner of the view; this flap being supposedly bent around a corner, and adhesively secured to, a side of the body.

In Fig. 28 the transverse intermediate lines 133, and which are opposite the points of V cuts 130a of the side flaps, are supposed to represent transverse V-shaped grooves 104 adapted to form miter joints at the running corners of the box when it is formed up as in Fig. 29. The transverse lines 134 of Fig. 28 at the left vertical edge of the view and those 134' nearest the right vertical edge of the view represent beveled edges of laminations, which when brought together as in Fig. 29 also form a corner miter-joint, at the top left-hand corner of the formed-up box of Fig. 29.

In the perspective, Fig. 33, the tubing, shown as lined with sheet metal 135 inside, may be made entirely of laminations of paper or the like, and in that view the heavy line 136 at the top adjacent an edge represents a flap or extension 138 of the outer sheet 137 which is bent around all the joints and serves to maintain the tube in the form shown; the flap being adhesively held. This flap 138 is practically the equivalent of the flap-extension 132 shown at the right end of the bendable sheet of Fig. 28 and in broken lines in the perspective Fig. 29.

In Fig. 25 three laminations of stock are shown, and a groove-cutting tool 139 is shown in work. The purpose of this view is to make plain the proper and preferred depth which a groove should reach. The broken lines of this view, which cross each other, coincide with the lines of the sides of the groove; and it will be noticed that the broken lines intersect at the lower face-plane 140 of the laminated stock. This rule should be followed for forming bevel joints, whether the ungrooved portion be thick or thin, in order that when the sides of the material at the grooves are brought together to form a miter joint due space for compression of the bent stock has been allowed for, inasmuch as to form one or more proper corner miter-joints there must remain sufficient material at the sides of the grooves to place the material at each such joint under compression when a box-body is bent up into ultimate form and the flap-extension of the outer lamination is secured; and further, so that the outer face shall not dangerously break or crack on the line of the bend. Such grooving is appropriate to the transverse grooves 104 of Fig. 28.

In Fig. 24 however the routing-tools 112 at either end of the figure represent cutters to form such closed slots, for example, as those 131 at the bases of the flaps 130 which are adjacent each longitudinal edge of Fig. 28, and which serve to hold in place closures 114 such as shown in Fig. 31. The broken-off vertical cutter 111 midway of the view Fig. 24 represents a saw, and the set of a tooth-point 141 appears at the bottom. Such a tool may be used for cross-cutting gangs of units, such as Fig. 28, which has supposedly been one of the gang shown in Fig. 23.

It will be obvious to those skilled in the art that various modifications may be resorted to without departing from the invention as defined in the appended claims.

What I claim as new, is:

1. Flat laminated stock, provided with offset superficially machined slits to ultimately form a shoulder joint.

2. Flat laminated stock, comprising three laminations provided with a superficially machined slit in each face lamination to ultimately form a separable joint.

3. Flat laminated stock, provided with a concealed slit to ultimately form part of a tongued and grooved joint.

4. Flat laminated stock, having a preformed, complete line of separation and the portions of the stock held together by friction, and slight connecting portions at intervals along the line of separation.

5. The method of making laminated stock in the web, comprising providing webs of sheet material, coating a sheet with an adhesive, bringing the sheets together flatwise and pressing them together against a flat friction-press to bond the stock in the web while the sheets and the stock are in motion.

6. The method of making machined laminated stock, comprising providing webs of sheet material, coating a sheet with an adhesive, bringing the sheets together flatwise to form stock in the web, pressing the sheets together to bond the stock, and maintaining the so-bonded stock during its production in flat form and in motion while it is being superficially machined.

7. The method of making separable closure joints in adhesively bonded flat laminated stock by adhesively bonding sheets of material together, and producing superficial slits in an unbonded portion and along closure-joint lines of the stock so bonded.

8. The method of making machined and adhesively bonded laminated stock in the web by producing a slit in a web of sheet material, bonding a sheet to the slit sheet, and thereby covering the slit.

9. Laminated stock, provided with offset superficially machined slits to ultimately form a shoulder joint, and the slits being interrupted at intervals by slight connecting portions of the material in order to hold the parts of the joint together in bonding.

10. Laminated stock, provided with a concealed slit to ultimately form part of a tongue and grooved joint, and the slit being interrupted at intervals by slight connecting portions of the material to hold the parts of the joint together in handling.

GEORGE C. SNYDER.